United States Patent [19]

Sato et al.

[11] Patent Number: 5,142,304
[45] Date of Patent: Aug. 25, 1992

[54] RECORDING APPARATUS HAVING AN AUTOMATIC SCAN DENSITY CONTROL FEATURE

[75] Inventors: Kaoru Sato, Hiyoshi; Takashi Soya, Kawasaki, both of Japan

[73] Assignee: Canon Kabushiki Kaisha, Tokyo, Japan

[21] Appl. No.: 563,859

[22] Filed: Aug. 7, 1990

Related U.S. Application Data

[63] Continuation of Ser. No. 350,649, May 11, 1989, abandoned.

[30] Foreign Application Priority Data

May 13, 1988 [JP] Japan ................ 63-114805

[51] Int. Cl.⁵ ............................................ H04N 1/21
[52] U.S. Cl. .................................... 346/108; 358/296
[58] Field of Search ........... 346/108, 107 R, 160; 358/296, 300, 298, 302

[56] References Cited

U.S. PATENT DOCUMENTS

| | | | |
|---|---|---|---|
| 3,831,091 | 8/1974 | Kanitz et al. | 325/18 |
| 4,319,285 | 3/1982 | Minerd | 358/300 |
| 4,393,387 | 7/1983 | Kitamura | 346/108 |
| 4,491,853 | 1/1985 | Hayashi et al. | 346/76 PH |
| 4,528,561 | 7/1985 | Kitamura | 340/745 |
| 4,578,689 | 3/1986 | Spencer et al. | 346/160 |
| 4,682,190 | 7/1987 | Ikeda | 346/160 |
| 4,742,363 | 5/1988 | Shiraishi | 346/108 |
| 4,816,924 | 3/1989 | Sekiya | 358/296 |
| 4,992,884 | 2/1991 | Sakata | 358/401 |

FOREIGN PATENT DOCUMENTS 2184910 12/1973 France .

*Primary Examiner*—Mark J. Reinhart
*Attorney, Agent, or Firm*—Fitzpatrick, Cella, Harper & Scinto

[57] ABSTRACT

A recorder has recording apparatus for recording data sent from a data source on a record medium at a selected one of a plurality of recording densities, and control apparatus for sending a signal indicating a record ready status of the recorder to the data source during the switching of the recording density in the recording apparatus. When the control apparatus receives the recording density switching command during the record operation, it holds the command, and after the end of the recording operation, it controls the recording apparatus in accordance with the held command to switch the recording density.

22 Claims, 7 Drawing Sheets

RECORDING APPARATUS HAVING AN AUTOMATIC SCAN DENSITY CONTROL FEATURE

This application is a continuation of application Ser. No. 07/350,649 filed May 11, 1989, now abandoned.

BACKGROUND OF THE INVENTION

1. Field of the Invention

The present invention relates to a recorder which records input data.

2. Related Background Art

In the past, the recording density of a recorder is, in general, fixed for each recorder. When the recording density is to be changed in a laser beam printer, a service man changes a rotating speed of a motor (polygon motor) which drives a polygon mirror which scans a laser beam. Recently, a laser beam recorder in which the rotating speed of the polygon mirror can be changed under a change command for recording density from a controller which is an external unit, has been developed. In such a recorder, however, if the recording density is switched during a recording operation, the image is disturbed because the rotating speed of the polygon mirror is changed during the recording operation. Accordingly, when the recording density is to be switched, it is necessary to resend the change of recording density command from the external unit after the recording operation is terminated. This significantly lowers the throughput.

A recorder whose recording density (resolution) is changeable is also disclosed in U.S. Pat. No. 4,393,387 and U.S. Pat. No. 4,528,561 assigned to the assignee of the present application, but further improvement has been desired.

SUMMARY OF THE INVENTION

It is an object of the present invention to eliminate the above problems.

It is another object of the present invention to improve a recorder.

It is other object of the present invention to provide a recorder having an improved throughput.

It is other object of the present invention to provide a recorder which prevents the problems which would otherwise occur in changing the recording density.

It is other object of the present invention to provide a recorder in which the recording density can be smoothly changed.

It is other object of the present invention to provide a recorder which prevents reduction of throughput in switching the recording density.

It is other object of the present invention to provide a recorder which reduces a burden of a data source which sends data to the recorder.

Other objects of the present invention will be apparent from the following description when taken in conjunction with the accompanying drawings.

DETAILED DESCRIPTION OF THE PREFERRED EMBODIMENTS

Figure 1:
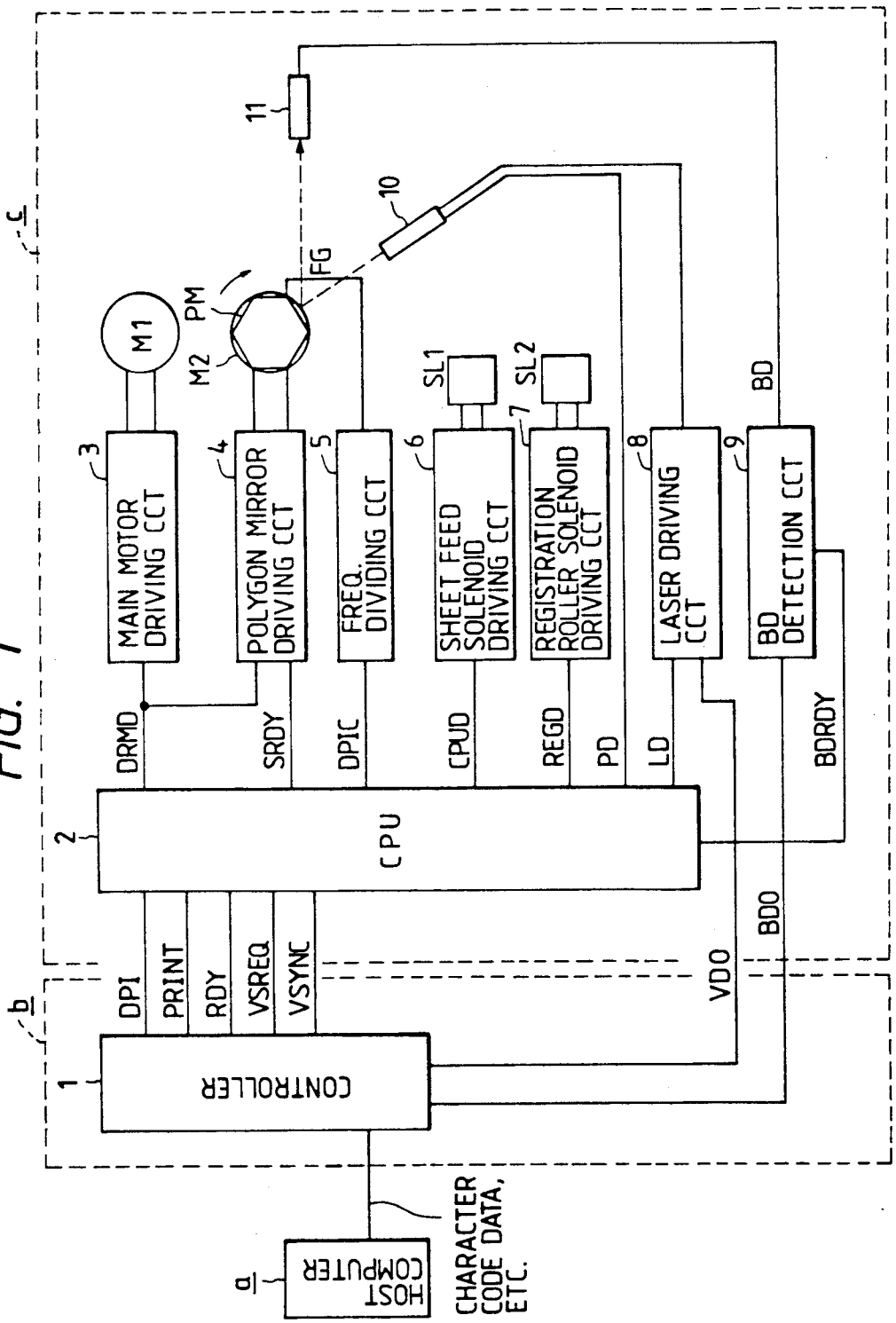
FIG. 1 is a block diagram of a laser printer in accordance with one embodiment of the recorder of the present invention.

FIG. 1 is a block diagram of a laser beam printer in accordance with one embodiment of the recorder of the present invention.

Numeral 1 denotes a controller connected to an external unit a such as a host computer for sending image information to a recoder c. The controller 1 in a video controller b generates dot data to be sent to the recorder c on a RAM (not shown) one page at a time based on control data and character code data sent from the external unit a. When the controller 1 receives a signal VSYNC to be described later from the recorder c, it sends the generated dot data to the recorder one line at a time as a video signal VDO.

A detail of the recoder c is now described. Numeral 2 denotes a CPU in a form of microcomputer for controlling the recorder c. It includes a ROM for storing a program for a control sequence to execute a process to be described later in connection with FIGS. 4 and 5, a working RAM, etc. Numeral 3 denotes a main motor drive circuit for driving a main motor M1 which feeds a record medium such as paper or film and drives a photoconductor drum (not shown).

Numeral 4 denotes a polygon motor drive circuit for driving a polygon motor M2 which scans a laser beam on the photoconductor drum, numeral 5 denotes a FG signal frequency divider for detecting a rotating speed of the polygon motor M2, numeral 6 denotes a drive circuit for a paper feed solenoid SL1 which drives a paper feed roller which feeds the record medium, numeral 7 denotes a drive circuit for a registration roller solenoid SL2 which drives a registration roller, numeral 8 denotes a laser drive circuit for driving a laser device 10 by the image signal VDO from the controller 1, and numeral 9 denotes a BD detection circuit which sends a beam detection signal BD produced by a beam detector 11 as the polygon motor M2 rotates to the controller 1. The laser device 10 includes a semiconductor laser which produces a laser beam in response to the drive by the laser drive circuit 8 and a photo-sensor provided to adjust the intensity of the laser beam.

The CPU 2 turns a ready signal RDY on for the controller 1 when the recorder is ready to record. When the rotating speed of the polygon motor M2 reaches a specified rotating speed and a temperature of a fixing unit (not shown) reaches a predetermined temperature and other various conditions required for recording are met, the CPU 2 normally determines that the recording is ready and turns the ready signal RDY on for the controller 1. When the controller 1 detects that the ready signal RDY is on, it turns on a print signal PRINT which is a start of record command. When the CPU 2 receives the print signal PRINT, it immediately turns on a main motor drive signal DRMD to start the record operation to drive the main motor M1. The main motor drive signal DRMD also functions as a polygon motor drive signal. Accordingly, the polygon motor M2 is also driven simultaneously. The polygon motor M2 produces the FG pulse in accordance with the rotating speed thereof and it is supplied to the frequency divider 5.

The controller 1 accepts the recording density information supplied from the external unit a or through the switching operation of an operator depending on the content of the image, irrespectively of the recording operation, and produces a dot density signal DPI which maintains an energization status at a high density and a deenergization status at a low density. When the CPU 2 receives it, it sends a dot density control signal DPIC to the frequency divider 5. The frequency divider frequency-divides the FG pulse supplied from the polygon motor M2 and supplies it to the polygon motor drive circuit 4. The dot density control signal DPIC modifies a frequency division factor. Namely, when the dot density control signal DPIC is at a high level, the frequency division factor is set to 1/n, and when it is at a low level, it is set to 1/m.

It is now assumed that the rotating speed of the polygon motor M2 at a high density recording mode (for example, h dpi (dots/inch) is Rh, the rotating speed at a low density recording mode (for example, l dpi) is Rl, and a relation between a frequency division factor of the FG pulse by the recording density and a rotating speed ratio of the polygon motor is $$n:m = Rh:Rl = h\ dpi:l\ dpi$$

The polygon motor drive circuit 4 controls a current to the polygon motor such that the period of the FG pulse is constant irrespective of the recording density, so that the rotation of the polygon motor M2 is stabilized. Accordingly, the CPU 2 switches the dot density control signal DPIC to the high level or the low level to switch the rotating speed of the polygon motor to comply with the recording density.

When the polygon motor M2 reaches a steady rotating speed determined by the recording density, the polygon motor drive circuit 4 turns on the polygon motor ready signal SRDY and sends it to the CPU 2. When the recording operation is started, the CPU 2 turns on a paper feed solenoid drive signal CPUD to drive the paper feed roller so that the record medium accommodated in a cassette is fed to the position of the registration roller. After the turn-on of a polygon motor ready signal SRDY has been detected, the CPU 2 send a sub-scan sync signal request signal VSREQ to the controller 1.

When the controller 1 receives the signal VSREQ, it checks if the sending of the image information is ready, and if it is ready, it sends a sub-scan sync signal VSYNC to the CPU 2.

When the CPU 2 receives the signal VSYNC, it immediately turns off the signal VSREQ. After a predetermined period, it turns on a registration roller solenoid drive signal REGD to feed the record medium toward a record position (transfer position) by the photoconductor drum. Accordingly, as the controller 1 sends the image signal VDO a predetermined time later in synchronism with the signal VSYNC, the image is formed starting from the predetermined position on the record medium.

The CPU 2 can calculate a laser radiation timing to the leading edge of the record medium based on a feed speed and a size of the record medium to detect the end timing of the image formation.

The CPU 2 adjusts the intensity (or volume) of the laser beam before the signal VSREQ is sent and after the turn-on of the signal SRPY. The adjustment of the intensity of the laser beam is effected by analog-to-digital converting a light intensity signal PD fed back from the photo-detector of the laser device 10 by the CPU 2, producing a digital-to-analog converted laser drive signal in response thereto, and holding it when the intensity of the laser beam reaches a predetermined intensity level. By irradiating the laser beam to a rotating polygon mirror PM, the beam detector 11 detects a beam of a constant period as the polygon motor is driven, and produces the beam detection signal. The beam detection circuit 9 reshapes it and sends a main scan sync signal BDO to the controller 1. It also sends a BD ready signal BDRDY to the CPU 2 when it detects the beam at a predetermined period.

Figure 2:
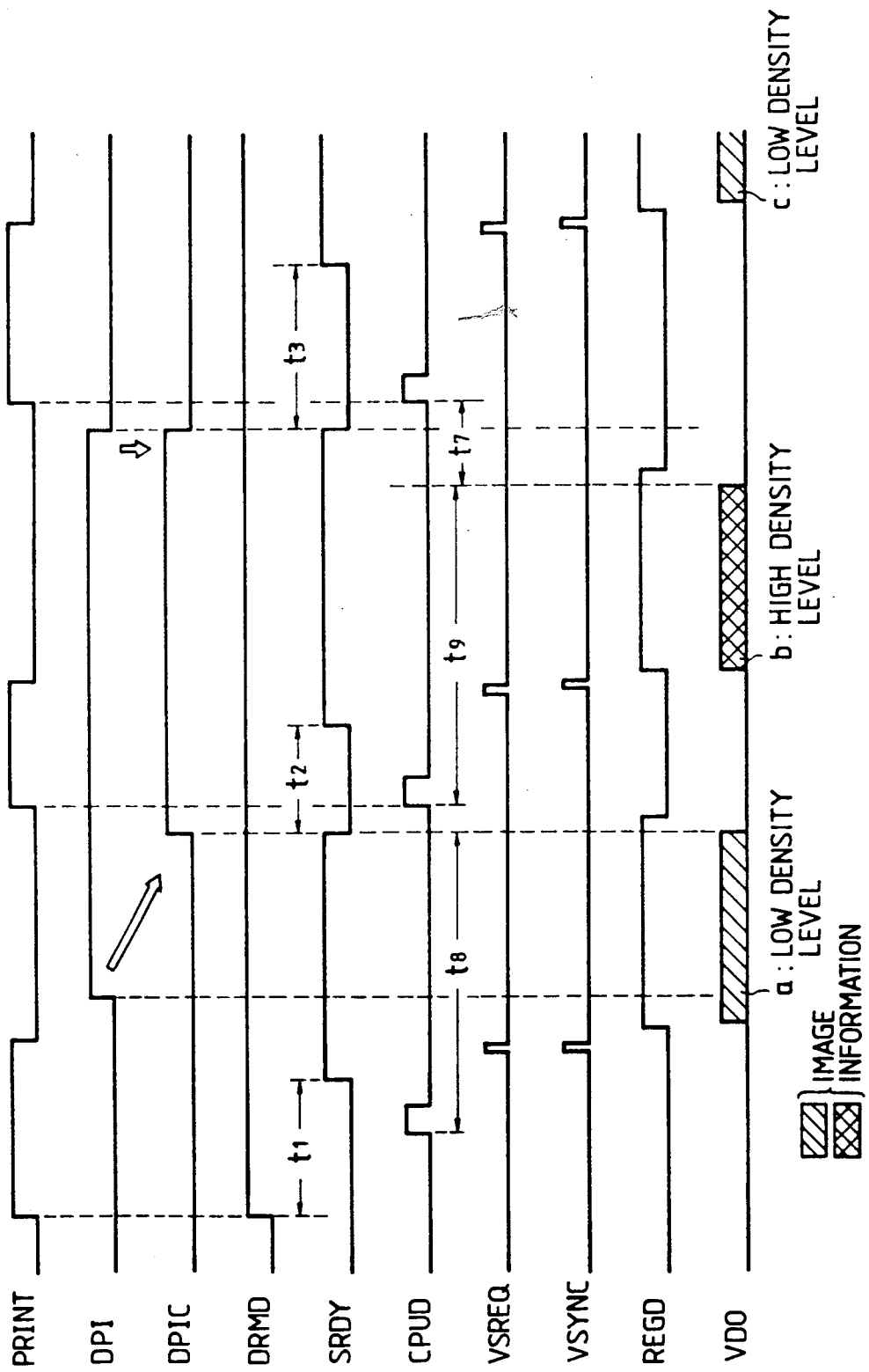
FIGS. 2 and 3 show timing charts for explaining the operation of the recorder shown in FIG. 1.

FIG. 2 shows the timing chart for drive timing and detection timing in forming an image by switching the dot density signal DPI.

When the controller 1 turns on the signal PRINT, the main motor drive signal DRMD is also turned on in the recorder. The polygon motor M2 starts to rotate, and after a time t1, the signal SRDY is turned on. After the paper feed roller has been driven, the CPU 2 starts to detect the turn-on of the signal SRDY. A period from the turn-on of the signal CPUD to the end of sending of the signal VDO is an image formation time t8 and t9. In FIG. 2, a, b and c indicate that the signal VDO is being sent.

It is now assumed that the signal DPI is switched from the low level to the high level in the time t8.

The CPU does not immediately switch the dot density control signal DPIC but it holds the signal until the end of sending of the signal VDO or until the end of image formation, and upon ending, it switches the signal DPIC from the low level to the high level.

Since the frequency division factor in the frequency divider 5 changes from 1/m to 1/n, the deviation of the rotating speed of the polygon motor M2 from the predetermined speed is detected and the signal SRDY is turned off. However, the CPU 2 releases the monitoring of the unlocked status of the polygon motor M2, and when the polygon motor M2 reaches the predetermined rotating speed after the time t2, it resumes the monitoring of the unlocked status. During this period, the CPU 2 holds the on-state of the ready signal RDY which indicates the record ready state to the controller 1. Accordingly, if the controller 1 turns on the signal PRINT which is the print command, the CPU 2 responds thereto to turn on the signal CPUD to feed the paper and start the print operation.

If the signal SRDY is turned on the time t2 after the end of the image formation of the preceding page (preceding record medium), the signal VSREQ is turned on after a predetermined time, and the transmission of the signal VSYNC and the signal VDO from the controller 1 are monitored.

If the signal DPI is switched after the time t9, that is, during the time t7 from the end of image formation to the turn-on of the print signal PRINT which is the next print command, the CPU 2 responds to the signal DPI to immediately switch the signal DIPC to switch the rotating speed of the polygon motor M2. It also releases the monitoring of the unlocked state of the polygon motor M2, and when the polygon motor M2 reaches the predetermined rotating speed, it resumes the monitoring of the unlocked state. During this period, the CPU 2 remains the on-state of the ready signal RDY which indicates the record ready status. Thus, if the controller 1 turns on the signal PRINT which is the print command, the CPU 2 responds thereto to feed the paper and resume the recording operation.

In the recorder of the present embodiment, since the ready signal RDY is not turned off to the controller 1 when the recording density is switched even if the polygon motor M2 has not reached the predetermined rotating speed, the recording operation is performed at high efficiency.

Figure 3:
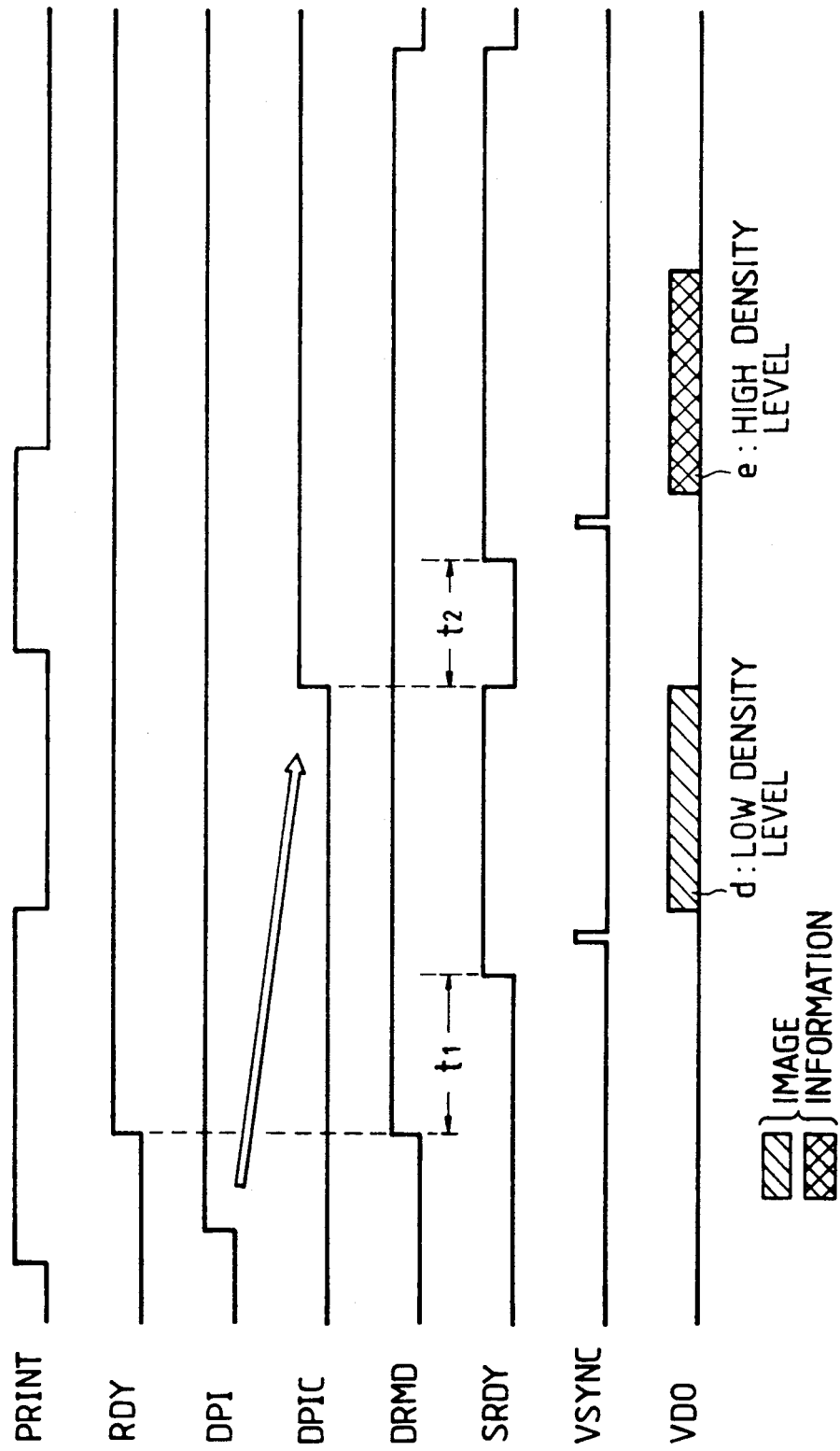

FIG. 3 shows the timing chart for switching the recording density when the signal DPI is switched while the controller 1 holds the on-state of the signal PRINT which is the print command.

It is assumed that the signal DPI is switched from the low level to the high level after the controller 1 has turned on the signal PRINT. The CPU 2 turns on the signal DRMD after the recording condition has been ready, to drive the main motor M1, the polygon motor M2, etc. However, since the CPU 2 detects the switching of the signal DPI when the controller 1 turns on the signal PRINT, the CPU 2 maintains the signal DPIC at the low level and controls the rotating speed of the polygon motor M2 such that the image is formed under the same condition as that prior to the switching of the signal DPI, that is, at the low recording density.

After the time t1 from the start of the drive of the main motor, the polygon motor M2 reaches the predetermined rotating speed and the signal SRDY is turned on. Then, the signal VSYNC and the signal VDO are sent from the controller 1, and when the image formation is completed, the CPU 2 switches the signal DPIC from the low level to the high level and controls the rotating speed of the polygon motor M2 so that the image is formed at the high recording density from the next page.

In FIG. 3, like in FIG. 2, the CPU 2 holds the on-state of the ready signal RDY to the controller 1 even if the signal DPIC is switched and the rotating speed of the polygon motor M2 is being switched.

Figure 4:
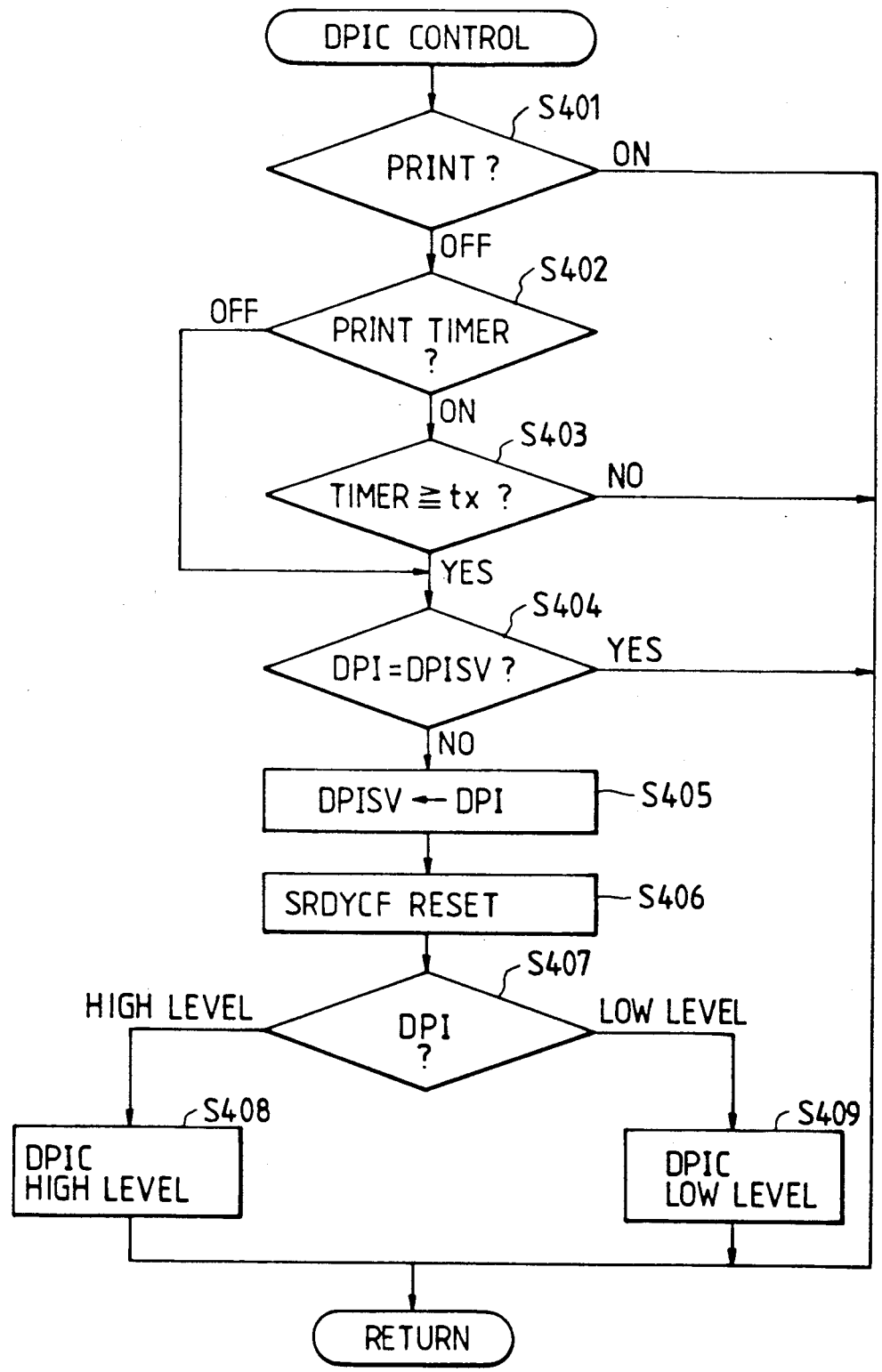
FIGS. 4 and 5 are flow charts of a control sequence in the configuration of FIG. 1.

FIG. 4 is a flow chart which shows a control sequence of the CPU 2 for controlling the signal DPIC which switches the frequency division factor of the frequency division circuit 5 to change the dot density (resolution of the record).

The process is started, and if the on-state of the signal PRINT is detected in a step S401, no process is performed and the process is returned (for example, it is returned to a main control routine (not shown)) so that no switching is performed. On the other hand, if it is detected that the signal PRINT is off in the step S401, the print sequence control timer is active in steps S402 and S403 and the content of the timer indicates a time after the end of image formation, then it is checked in a step S404 whether the current signal DPI matches the recording density prior to the paper feeding, and if it does not match, the level of the signal PDI is saved in a predetermined area DPISV of the RAM as the latest recording density information, in a step S405. Then, in a step S406, a SRDY signal monitor flag SRDYCF in a predetermined area of the RAM is reset to release the monitoring of the unlocked status of the polygon motor M2. In a step S407, whether the signal DPI is at the high level or the low level is checked, and depending on the decision, the signal DPIC is rendered the high level or the low level in a step S408 or S409.

Figure 5:
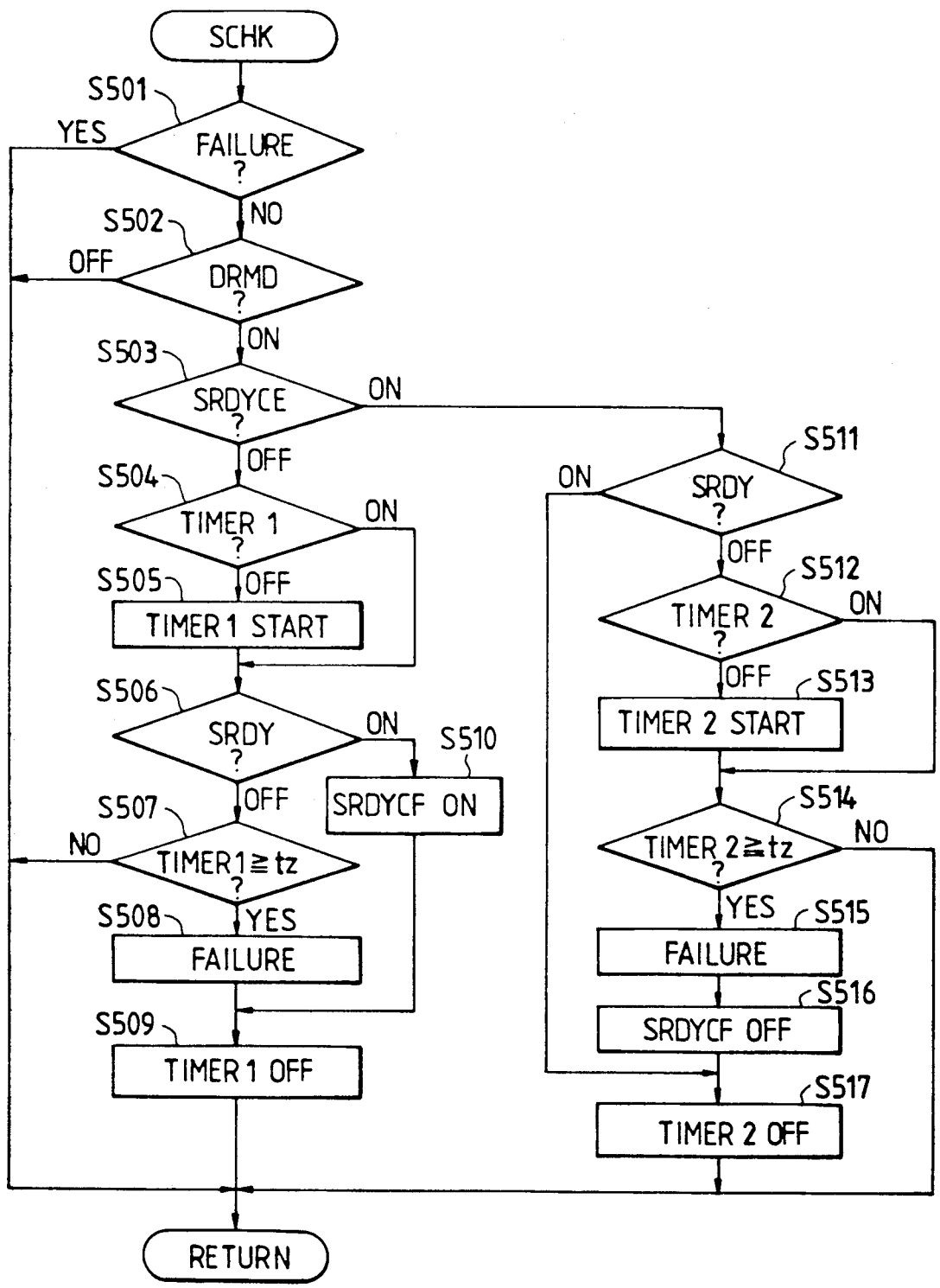

FIG. 5 is a flowchart which shows a control sequence of the unlocked status monitoring process for the polygon motor M2.

In a step S501, whether the polygon motor M2 is in trouble is checked, and if it is in trouble, the process is returned and an error process such as error indication is performed. If it is normal, whether the polygon motor drive signal DRMD is on is checked in a step S502, and if it is off, the process is returned. On the other hand, if it is on, whether the unlocked status monitoring flag SRDYCF for the polygon motor M2 is on is checked in a step S503, and if it is off, a step S504 is performed to monitor the rise of the polygon motor M2. If it is on, a step S511 is performed to monitor the unlocked status.

In the steps S504 and S505, if a timer (timer 1) provided for monitoring the rise of the polygon motor is not active, the timer 1 is activated. In a step S506, whether the signal SRDY which indicates that the polygon motor M2 has reached the predetermined rotating speed is on or off is checked, and if it is on, the flag SRDYCF is turned on in a step S510 to monitor the unlocked status of the polygon motor M2. In a step S507, whether the timer 1 has exceeded a permitted time ty for the rise of the polygon motor or not is checked, and if it has exceeded it is determined that a trouble has occurred (step S508), and the timer 1 is deactivated in a step S509.

In a step S511, whether the polygon motor M2 is in the unlocked status is checked. If it is in the unlocked status, whether a timer (timer 2) provided for monitoring the unlocked status is active is checked in steps S512 and S513, and if it is not active, the timer 2 is activated. In a step S514, whether the timer 2 has exceeded a permitted time tz for the unlocked status is checked, and if it has exceeded, it is determined in a step S515 that a trouble has occurred. In a step S516, the flag SRDYCF is reset, and in a step S517, the timer 2 is deactivated.

In the present embodiment, the recording density switching command is accepted even during the image formation, and the information thereof is held by the CPU 2. After the completion of the current image information process, the rotating speed of the polygon motor M2 is switched (step S404 to S409 in FIG. 4). The start of record command from the external controller is accepted even during the switching of the rotating speed so that the switching of the recording density in the continuous recording operation is permitted while the recording operation is performed without significantly reducing the throughput. It is not necessary to make the external unit or the operator pay attention to the recording density switching timing.

Figure 6:
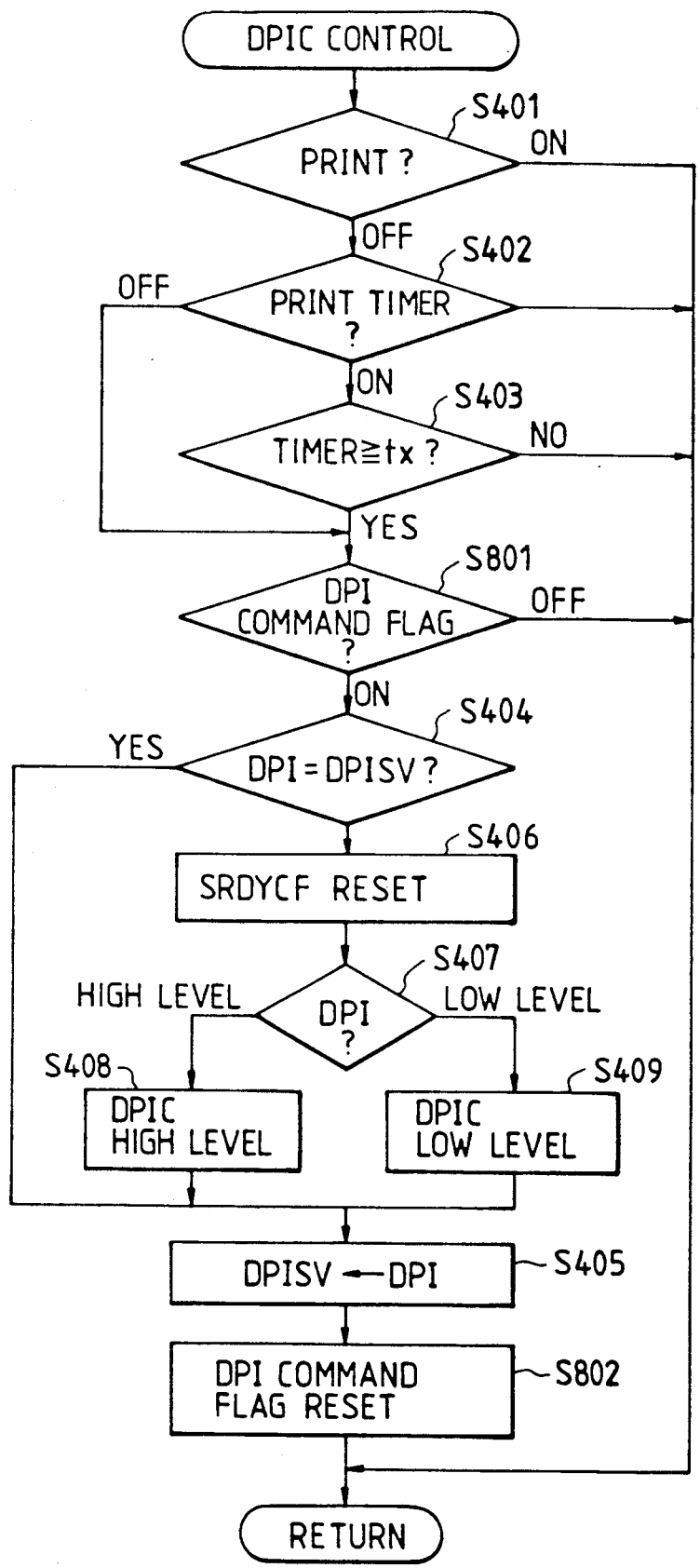
FIG. 6 is a flow chart of other control sequence for the configuration of FIG. 1.

FIG. 6 shows another embodiment of the DPIC control sequence performed by the CPU 2. In the present embodiment, the recording density switching command is sent by communication means between the controller 1 and the CPU 2.

The control in the present embodiment is substantially identical to that of FIG. 4, and the like steps are designated by the like numerals. In the present embodiment, the recording density switching command sent from the controller 1 is set into the command flag DPI at a predetermined area of the RAM in the CPU 2. In the step S801, the command flag DPI is examined, and if it is on, the same process as that in FIG. 4 is performed. Finally, in a step S802, the command flag DPI is reset. In this manner, the same effect as that of the previous embodiment is attained.

In the above embodiments, the inhibition of the recording density switching during the recording operation (during the image formation) is done by the software of the CPU 2. Alternatively, it may be done by hardware.

Figure 7:
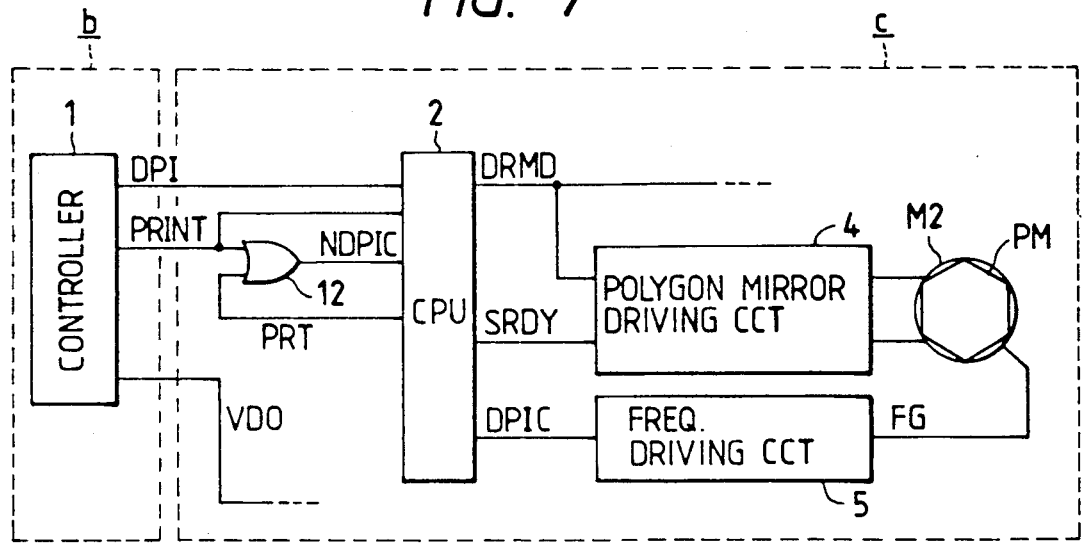
FIGS. 7 and 8 are block diagrams of two other embodiments of the present invention.

FIG. 7 shows a configuration for such an embodiment. The like elements to those shown in FIG. 1 are designated by the like numerals.

In FIG. 7, an OR gate 12 is provided to OR the signal PRINT which is the print command from the controller 1 and the image formation period signal produced by the CPU 2, that is, a signal PRT which is at a high level from the time point of paper feed to the end of the image signal VDO sent from the controller 1, and a signal NDPIC which is a logical OR signal is supplied to the CPU 2. When the logical OR signal NDPIC is at the high level, the CPU 2 holds the signal DPIC without switching if even if the signal DPI is switched, and when the signal NDPIC changes to the low level, it switches the signal DPIC in accordance with the signal DPI.

Figure 8:
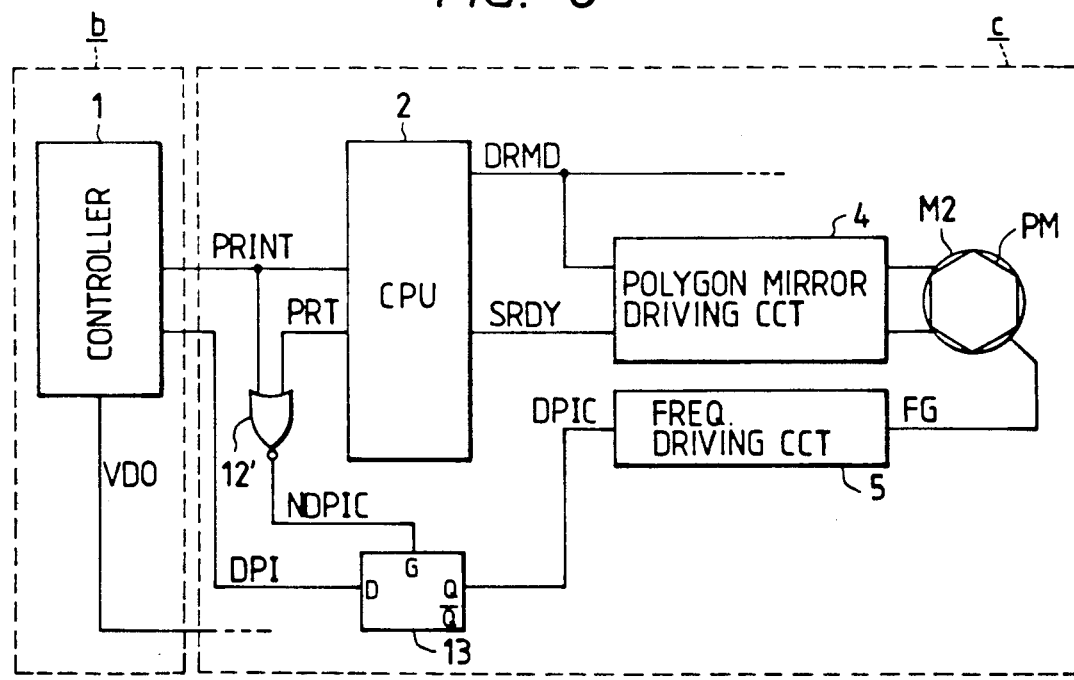

FIG. 8 shows another embodiment in which the inhibition of the recording density switching during the recording operation is done by hardware. In the present embodiment, like in the embodiment of FIG. 7, the signal PRINT and the signal PRT are NORed by a NOR gate 12' to produce a signal NDPIC. A TTL 13 such as 74LS75 bistable latch which produces the signal DPIC in accordance with the signal DPI when the signal NDPIC is at the high level and holds the signal DPIC by neglecting the signal DPI when the signal NDPIC is at the low level, is provided.

The configuration of FIG. 7 or FIG. 8 offers the same effect as that described above.

In the above embodiments, the laser beam printer having the polygon motor is used and the image formation period is defined as from the paper feed operation to the end of sending of the image signal VDO and the switching of the rotating speed of the polygon motor is inhibited during the period. However, depending on the type of recorder, no polygon motor is used such as in LED array or liquid crystal shutter recorder, and the image formation period differs. In such a case, the inhibit period for the recording density switching is appropriately set in accordance with the type of recorder and the control is done in the manner described above to attain the same effect.

In accordance with the present embodiment, the recording density switching command is accepted even during the image formation, and the recording density switching means is controlled after the completion of the image formation, accordingly, the recording density switching in the continuous recording operation is permitted while the recording is done without reducing the throughput. Since it is not necessary to make the external unit pay attention to the recording density switching timing, a burden to the external unit or an operator who manipulates the switching is eliminated.

By accepting the start of record command during the control of the recording density switching the recording to the next record medium can be done immediately after the end of the switching operation. Accordingly, the throughput is further improved.

The present invention is not limited to the illustrated embodiments but various modifications may be mode without departing from the scope of claim.

We claim:

1. A recorder comprising:
   record means capable of performing a recording operation at a plurality of recording dot densities; and
   control means for receiving data sent from an external data source and processing the data to output same to said record means,
   said control means being capable of sending a signal indicating a record ready status of the recorder to the data source and receiving data sent from the data source during the switching of the recording dot density of said record means.

2. A recorder according to claim 1, wherein said record means includes laser beam generation means for generating a laser beam, a polygon mirror for scanning the laser beam, and polygon mirror drive means for controlling a rotating speed of said polygon mirror in accordance with the selected recording dot density.

3. A recorder according to claim 1, wherein said control means receives a recording dot density switching command during the record operation, said control means holds the received recording dot density switching command, and after the end of the record operation, controls said record means in accordance with the held recording dot density switching command to switch the recording dot density.

4. A recorder according to claim 1, wherein when said control means receives the recording dot density switching command during the reception of a start of record command sent from said data source, said control means holds the received recording dot density switching command, and after the end of the record operation, controls said record means in accordance with the held recording dot density switching command to switch the recording dot density.

5. A recorder according to claim 2, wherein said control means receives the recording dot density switching command sent from said data source and controls said polygon mirror drive means in accordance with the received recording density switching command to switch the rotating speed of the polygon mirror.

6. A recorder comprising:
   record means for recording record data, said record means being capable of performing a recording operation at a plurality of recording dot densities; and
   control means for receiving record data and recording dot density designation data sent from an external data source and processing the data to output same to said record means, and for controlling the recording dot density of said record means on the basis of the recording dot density designation data,
   said control means being capable of sending a signal indicating a record ready status of the recorder to said data source and receiving data sent from the data source, during the switching of the recording dot density of said record means.

7. A recorder according to claim 6, wherein said record means includes laser beam generation means for generating a laser beam, a polygon mirror for scanning the laser beam, and polygon mirror drive means for controlling a rotating speed of the polygon mirror in accordance with the designated recording dot density.

8. A recorder according to claim 7, wherein when said control means receives the recording dot density designation data duringn the record operation, said control means holds the received recording dot density designation data, and after the end of the record operation, controls said polygon mirror drive means in accordance with the held recording dot density designation data to switch the rotating speed of the polygon mirror.

9. A recorder according to claim 7, wherein when said control means receives the recording dot density designation data during the reception of a start of record command sent from said data source, said control means holds the received recording dot density designation data, and after the end of the record operation, controls said polygom mirror drive means in accordance with the held recording dot density designation data to switch the rotating speed of the polygon mirror.

10. A recorder according to claim 6, wherein the record data is image information, and the recording dot density designation data is sent to said control means in a form of command.

11. A recorder comprising:
record means capable of performing a recording operation at a plurality of recording dot densities, said record means outputting a recording period signal;
control means for receiving data sent from an external data source and processing the data to output same to said record means, said control means outputting the processed data after sending a record start signal; and
inhibit signal output means for outputting to said record means an inhibit signal for inhibiting the switching of the recording dot density on the basis of the recording period signal from said record means and the record start signal from said control means.

12. A recorder according to claim 11, wherein said record means comprises:
laser beam generation means for generating a laser beam;
a rotating polygon mirror for scanning the laser beam; and
polygon mirror drive means for controlling the switching of a rotation speed of the polygon mirror in accordance with a set recording dot density.

13. A recorder comprising:
record means capable of performing a recording operation at a plurality of recording dot densities, said record means outputting a recording period signal;
control means for receiving the data sent from an external data source and processing the data to output same to said record means, said control means outputting the processed data after sending a record start signal;
recording dot density designation signal output means for outputting a recording dot density designation signal for designating a recording dot density; and
recording density control signal output means for outputting a recording dot density control signal for controlling the recording dot density of said record means, on the basis of the recording period signal, the record start signal and the recording dot density designation signal.

14. A recorder according to claim 13, wherein said record means comprises:
laser beam generation means for generating a laser beam;
a rotating polygon mirror for scanning the laser beam; and
a polygon mirror drive means for controlling the switching of a rotation speed of the polygon mirror in accordance with a set recording dot density.

15. A recorder comprising:
a controller for receiving data from an external data source and for processing the data to generate image data; and
a recording unit capable of performing a recording operation at a plurality of recording dot densities said recording unit recording in accordance with the image data from said controller at one of the plurality of recording dot densities;
wherein said controller is capable of receiving data sent from the external data source during the switching of the recording dot density of said record unit.

16. A recorder according to claim 15, wherein said recording unit comprises a laser beam generator, a polygon mirror for scanning the laser beam, and a polygon mirror driver for rotating said polygon mirror at a speed which is set relative to a selected one of the plurality of recording dot densities.

17. A recorder according to claim 15, wherein said controller receives recording dot density information from the external data source and sends a recording density switching command to the recording unit in accordance with the recording density information so as to switch the recording dot density.

18. A recorder according to claim 17, wherein when said recording unit receives the recording dot density switching command between the reception of a start of a recording command and the end of a recording operation, said recording unit switches the recording dot density in accordance with the recording density switching command after the end of the recording operation.

19. A recorder according to claim 15, wherein said controller receives character coded data from the external data source and processes the character coded data to generate the image data.

20. A line recorder comprising:
a controller for receiving data from an external data source and for processing the data to generate image data, said controller outputting the image data and a print signal corresponding to a recording operation;
a recording unit capable of performing the recording operation at a plurality of recording dot densities, said recording unit recording in accordance with the image data from said controller at a selected one of the plural recording dot densities and outputting a recording period signal during performing the recording operation; and
an inhibit controller for inhibiting the switching of the recording dot density on the basis of both the recording period signal from said recording unit and the print signal from said controller.

21. A recorder according to claim 20, wherein said inhibit controller comprises an OR gate arranged to input both the print signal and the recording period signal.

22. A recorder according to claim 20, wherein said controller receives data sent from the external data source during the switching of the recording dot density of said recording unit.

* * * * *

UNITED STATES PATENT AND TRADEMARK OFFICE
CERTIFICATE OF CORRECTION

PATENT NO. : 5,142,304
DATED : August 25, 1992
INVENTOR(S) : Kaoru SATO, et al.

It is certified that error appears in the above-identified patent and that said Letters Patent is hereby corrected as shown below:

COLUMN 1:
    line 67, "flow charts" should read --flowcharts--.

COLUMN 2:
    line 1, "flow chart" should read --flowchart--.

COLUMN 7:
    line 15, "if" (first occurrence) should be deleted.
    line 63, "mode" should read --made--; and
    line 64, "of claim." should read --of the claims.--.

COLUMN 8,
    line 63, "duringn" should read --during--.

COLUMN 9,
    line 3, "of" (second occurrence) should read --of a--.

COLUMN 10,
    line 34, "recording density" should read --recording dot density--; and
    line 41, "line" should be deleted.

Signed and Sealed this

Fifth Day of October, 1993

*Attest:*

BRUCE LEHMAN

*Attesting Officer*     *Commissioner of Patents and Trademarks*